United States Patent Office 2,801,253
Patented July 30, 1957

2,801,253

IN SITU EPOXIDATION OF ORGANIC ESTERS WITH SULFURIC AND ACETIC ACIDS

Frank P. Greenspan and Ralph J. Gall, Buffalo, N. Y., assignors, by mesne assignments, to Food Machinery and Chemical Corporation, San Jose, Calif., a corporation of Delaware No Drawing. Application July 13, 1953, Serial No. 367,752

1 Claim. (Cl. 260—348.5)

The present invention relates to a method of epoxidizing compounds containing an ethylenic linkage, and particularly those present in esters of the higher unsaturated fatty acids. The epoxidation is performed with hydrogen peroxide, acetic acid, and a small amount of sulfuric acid and at a relatively high temperature.

Heretofore, the principal method of epoxidizing unsaturated fatty acid esters has employed a prepared peracetic acid solution. Such solutions are generally equilibrium mixtures of hydrogen peroxide and peracetic acid. Under the reaction conditions generally employed for epoxidation, substantially only the peracid fraction is utilized and little or no further formation of peracid from $H_2O_2$ occurs. This is extremely wasteful, as much as 20% of the available active oxygen remaining unutilized. Accordingly, in situ reaction techniques, wherein $H_2O_2$ is added to an aliphatic acid solution of the unsaturated compound under peracid formation conditions, have long been sought, for epoxidation reactions. Such techniques are standard for hydroxylation reactions with $H_2O_2$.

Despite the recognized attraction of an in situ epoxidation procedure, little progress has been made in this direction because of the extreme difficulty of setting up reaction conditions favorable to the required peracid formation, which simultaneously would not destroy the desired end product, the formed epoxy derivative. It is to be noted that the very same conditions favoring peracid formation, notably high molar ratios of aliphatic acid to $H_2O_2$, high temperatures, high acidity, long reaction times, are known to be deleterious to the survival of an epoxy compound.

Heretofore the only method known for in situ epoxidation was one employing formic acid and hydrogen peroxide. Under the conditions of use, the reaction times for this process are long. The formic acid is difficultly recoverable by reason of the fact that its boiling point is substantially the same as that of water, and furthermore the cost of formic acid is relatively high. Performic acid, the peracid formed as an intermediate in this reaction, is recognized to be a very unstable compound.

Epoxy fatty acid esters find application as lubricants, lubricant additives, stabilizers, plasticizers, textile oils, etc. For use as stabilizers and plasticizers for polyvinyl chloride type resins, compatibility and heat stability are important considerations. Since unsaturated fatty acid esters are poorly compatible with polyvinyl chloride resins, it is of paramount importance that the residual unsaturated ester content of an epoxy fatty acid ester plasticizer be low (low iodine value) to avoid spewing and related difficulties. Further, such epoxy stabilizers and plasticizers must be stable to the elevated temperatures used in plastic processing.

The in situ process described herein gives substantially lower iodine values than the previously described in situ technique employing formic acid. Further, the co-product present in small amounts with epoxy ester is an acetoxy derivative recognized to be more stable to cleavage than the corresponding formoxy compound formed when formic acid is used. The latter tends to split off formic acid under certain storage and processing conditions.

In epoxidation reactions, therefore, the desirable end product is one containing the group:

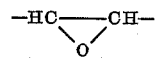

the so-called oxirane group in preference to a hydroxylated precussor of a product of the following structure:

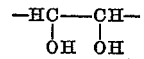

or a so-called glycol.

It is an object of the present invention to provide a process for manufacturing epoxidized esters of the unsaturated higher fatty acids by the employment of hydrogen peroxide and acetic acid.

It is also an object of the invention to prepare such epoxidized esters in extremely short periods of time.

It is a further object of the invention to prepare such epoxidized esters without the necessity of employing a prepared peracetic acid.

It is a further object to provide an economical process for epoxidation.

It is a further object to provide a safe controllable epoxidation reaction.

It is a further object to provide a process allowing for ready recovery of the aliphatic acid used.

It is also an object of the invention to produce such epoxidized esters uncontaminated with any considerable amount of hydroxylated product.

In the broad aspect of the invention, an ester of an unsaturated higher fatty acid; that is to say, an acid containing from 16 to 22 carbon atoms, is reacted at temperatures between about 60° C. and 110° C. with hydrogen peroxide, acetic acid and a small amount of sulfuric acid, for a period of time of from ½ hour to 21 hours.

The reaction may be performed either in the presence of or in the absence of a solvent. In general, reactions performed at the upper end of the preferred temperature range give somewhat better yields of the desired epoxidized product if a solvent be present, although this is not a requirement of the invention.

The presence in the reaction mixture of from about ½% to 5% sulfuric acid, based upon the combined weight of acetic acid and aqueous hydrogen peroxide, is a requirement of the invention in order to obtain high yields of oxirane oxygen at the elevated temperatures and short periods of time of the reaction.

Other mineral acids, even those known to be good peracid formation catalysts, do not function in this reaction as sulfuric acid does, and can not be used.

Furthermore, the amount of acetic acid per mole of ethylenic unsaturation to be reacted in the ester treated should be from 0.25 mole to 1 mole. As the source of oxygen, the hydrogen peroxide should be present in approximately molar quantities for each ethylenic linkage present in the product to be epoxidized. A slight excess will generally be employed.

The epoxidation proceeds smoothly only in the presence of sulfuric acid. In the absence of sulfuric acid, the yields of oxirane product are low.

The advantage of performing the process in the presence of the stated ½% to 5% sulfuric acid, resides in the production not only of the very high proportion of oxirane product, but also the very high proportion of double bond reacted upon.

Although it is not necessary to employ a solvent in carrying out the procedures of the present invention, in general, products with higher epoxy values are produced in the presence of a solvent as compared with the performance of the epoxidation in the absence of the solvent, other conditions being the same.

The amount of sulfuric acid present appears to control the percent of epoxy ester formed and, in some fashion, to enter into the mechanism of the epoxidation. Where the quantity of sulfuric acid is low, the epoxidation is not complete and the epoxy ester production poor. It is generally preferred to employ from about 1% to 5% sulfuric acid.

In the following table there is set forth the results of the epoxidation of butyl oleate of an initial iodine value of 74.

The various epoxidation reactions were performed in benzene as a solvent at a temperature of 60° C. to 65° C. employing 0.5 M acetic acid and 10% excess hydrogen peroxide 50%. The amount of sulfuric acid was varied as indicated.

TABLE 1

| Percent $H_2SO_4$ | Percent Epoxy | Percent Epoxy Ester | Iodine Number | Time, Hours |
| --- | --- | --- | --- | --- |
| 0.1 | 2.39 | 53.1 | 31.4 | 29:30 |
| 0.5 | 3.21 | 71.3 | 6.3 | 19:00 |
| 1.0 | 3.54 | 78.6 | 4.0 | 21:15 |
| 1.25 | 3.32 | 73.7 | 4.9 | 13:00 |
| 1.50 | 3.53 | 78.4 | 3.9 | 17:00 |
| 2.00 | 3.62 | 80.5 | 7.7 | 14:00 |
| 3.00 | 3.61 | 80.3 | 6.5 | 11:00 |
| 5.00 | 3.35 | 74.5 | 7.3 | 5:05 |
| 10.00 | 3.00 | 66.6 | 6.0 | 4:05 |
| 19.00 | 2.85 | 63.3 | 5.6 | 4:05 |

The following examples are given merely as illustrative of the invention and not as limitative of the conditions, as the broad ranges have been stated above.

*Example 1*

100.0 g. of butyl oleate (iodine #74 and equivalent to 0.29 mole of ethylenic unsaturation) were weighed into a three-neck flask equipped with a reflux condenser, thermometer and mechanical stirrer. 9.2 g. of glacial acetic acid (0.153 mole) were added to the butyl oleate and the mixture warmed to 50° C. 1.24 g. of 50% $H_2SO_4$ were added, followed by the slow addition of 20.6 g. of 50% $H_2O_2$ (0.303 mole) over 2 hours. The temperature was then raised to 60° C. and controlled between 60° C. to 65° C. until the reaction was complete. Samples of the reaction mixture were periodically withdrawn and titrated for residual $H_2O_2$. When approximately 5 to 10% of the $H_2O_2$ remained unreacted, usually after 8 to 10 hours, the reaction mixture was poured into a separatory funnel and the aqueous layer drawn off. The oil layer was washed with successive portions of warm water until acetic acid free. The oil layer was dried with anhydrous sodium sulfate and filtered. The clear, pale yellow oil was analyzed for percent oxirane oxygen by the method of Swern et al., Analytical Chemistry 19, 414 (1947), and for iodine number by the method of Hanus (Scotts' Standard Methods of Chemical Analysis, N. H. Furman, editor, vol. 2, 1767). The analysis of the above oil was found to be: Percent oxirane oxygen—3.40 (theoretical 4.49). Iodine number—8.5.

*Example 2*

100.0 g. of butyl oleate (iodine #74 equivalent to 0.29 mole of ethylenic unsaturation) were weighed into a three-neck flask equipped with a reflux condenser, thermometer and mechanical stirrer. 20.0 g. of benzene and 9.2 g. of glacial acetic acid (0.153 mole) were added to the butyl oleate and the mixture warmed to 50° C. 1.24 g. of 50% $H_2SO_4$ was added. 21.78 g. of 50% $H_2O_2$ (0.32 mole) were slowly added over two hours. The temperature was then raised to 60° C. and controlled between 60° C. and 65° C. until the reaction was complete as determined by periodic titrations of reaction mixture for unreacted $H_2O_2$. Approximately 5 to 10% remained unreacted at the end of 12 to 14 hours. The reaction mixture was poured into a separatory funnel and the aqueous layer drawn off. The oil layer was washed with successive portions of warm water (40 to 45° C.) until acetic acid free. The benzene and traces of water were removed in a vacuum stripping column at 60 to 70° C. and 5 to 10 mm. The clear pale yellow oil was analyzed and found to contain: Percent oxirane oxygen—3.60 (theoretical 4.49). Iodine number—5.4.

*Example 3*

100.0 g. of butyl oleate (iodine #74 equivalent to 0.29 mole of ethylenic unsaturation), 40.0 g. of toluene, 8.75 g. of glacial acetic acid (0.146 mole) and 1.24 g. of 50% $H_2SO_4$ were weighed into a three-neck flask equipped with a reflux condenser, thermometer and mechanical stirrer. 23.76 g. of 50% $H_2O_2$ (0.349 mole) were added over a one hour period while heating the reaction mixture to 95° C. The reaction was continued in the range of 90° to 95° C. for approximately one additional hour. The oil layer was washed, dried, stripped, and analyzed as described above. The product was found to contain: Percent oxirane oxygen—3.1 (theoretical 4.49%). Iodine number—7.2.

*Example 4*

80.0 g. of benzene, 18.4 g. of glacial acetic acid (0.306 mole) and 2.6 g. of 50% $H_2SO_4$ were added in that order to 200.0 g. of butyl oleate (0.58 mole) in a reaction flask equipped with a reflux condenser, thermometer and mechanical stirrer. The reaction mixture was warmed to 80° C. and 47.5 g. of 50% $H_2O_2$ (0.70 mole) were slowly added over a 40 minute period. The reaction was continued at 80° to 85° C. for an additional two and ½ hours. The reaction mixture was cooled and the oil layer was washed and stripped of benzene and water as described above. The clear pale yellow oil had: Percent oxirane oxygen—3.58 (theoretical 4.49). Iodine number—4.8.

*Example 5*

200.0 g. of soybean oil (iodine #135 equivalent to 1.06 moles of ethylenic unsaturation), 40.0 g. of benzene, 33.0 g. of glacial acetic acid (0.55 mole) and 1.07 g. of 96% $H_2SO_4$ were mixed in a three-neck flask equipped with a reflux condenser, thermometer and mechanical stirrer. 74.88 g. of 50% $H_2O_2$ (1.1 moles) were slowly added to the above over 1.2 hour at 20° C. The reaction mixture was warmed to 60° C. and maintained at that temperature for 15 hours. The oil layer was washed and stripped of benzene and water as outlined above. The isolated product on analysis was found to contain: Percent oxirane oxygen—5.75 (theoretical 7.8). Iodine number—9.2.

*Example 6*

100.0 g. of butyl cottonoate—butyl ester of cottonseed oil fatty acids—(iodine #66.7 equivalent to 0.262 mole), 8.2 g. of glacial acetic acid (0.137 mole), and 0.26 g. of 96% $H_2SO_4$ were mixed in a reaction flask equipped with a reflux condenser, thermometer and a mechanical stirrer. 18.58 g. of 50% $H_2O_2$ (0.273 mole) were added to the reaction mixture at room temperature over a ½ hour period. The reaction mass was warmed to 60° C. and maintained at 60 to 65° C. for an additional 21 hours. The oil layer was washed and dried as described above. The light-colored oil was found to contain: Percent oxirane oxygen 3.09 (theoretical 4.03). Iodine number 2.8.

The specific esters employed in the examples have shown particular advantages, at the present time, as plasticizers with special resins. The epoxidation reaction is, however, of general applicability to esters of the unsaturated higher fatty acids wherein the esterifying group is a straight or branched chain of the aliphatic type, the reaction being directed to the unsaturated linkage in the fatty acid molecule.

By the employment of acetic acid and hydrogen peroxide in the presence of sulfuric acid, an end product may be produced in which a greater proportion of the double bond of the ester of the unsaturated acid has been reacted upon, than by other methods currently available. That is to say, the product possesses a lower iodine value. This is of particular value where the product finds use as a plasticizer for vinyl resins.

What is claimed is:

The method of epoxidizing an ester of an unsaturated higher fatty acid which comprises adding with stirirng to said ester about 0.25 to 1 mole of acetic acid per mole of ethylenic unsaturation to be reacted in said ester, about 0.5 to 5% of sulfuric acid based on the combined weight of an acetic acid and hydrogen peroxide used, and about 1 mole of hydrogen peroxide per mole of ethylenic unsaturation to be reacted in said ester said hydrogen peroxide being added to said ester following addition of substantially all the acetic acid and sulfuric acid, heating the reaction mixture to substantially 60° C. to 110° C. and maintaining this temperature during the epoxidation reaction.

References Cited in the file of this patent

UNITED STATES PATENTS

| 1,988,448 | Hopff | Jan. 22, 1935 |
| 2,443,280 | Swern | June 15, 1948 |
| 2,458,484 | Terry | Jan. 4, 1949 |
| 2,485,160 | Niederhauser | Oct. 18, 1949 |
| 2,543,419 | Niederhauser | Feb. 27, 1951 |
| 2,567,930 | Findley | Sept. 18, 1951 |
| 2,569,502 | Swern | Oct. 2, 1951 |

OTHER REFERENCES

Groggins: "Unit Processes in Org. Synthesis," fourth ed. (1952), pp. 418 and 419.

Swern: Chemical Reviews, vol. 45, August 1949, pp. 25–28.

Swern: J. American Chemical Society, vol. 67, October 1946, pp. 1786–9.

Findley: J. Amer. Chem. Soc., March 1945, vol. 67, pp. 412–14.